United States Patent [19]

Reuter et al.

[11] Patent Number: 5,149,367
[45] Date of Patent: Sep. 22, 1992

[54] PRINTING INKS

[75] Inventors: Knud Reuter, Krefeld; Thomas Scholl, Meerbusch, both of Fed. Rep. of Germany

[73] Assignee: Bayer Aktiengelselschaft, Leverkusen, Fed. Rep. of Germany

[21] Appl. No.: 707,494

[22] Filed: May 30, 1991

[30] Foreign Application Priority Data

Jun. 7, 1990 [DE] Fed. Rep. of Germany ........ 4018182

[51] Int. Cl.$^5$ ............................................. C09D 11/02
[52] U.S. Cl. ........................................ 106/22; 106/20
[58] Field of Search ........................... 106/20, 23, 22; 427/256, 54.1

[56] References Cited

U.S. PATENT DOCUMENTS

| | | | |
|---|---|---|---|
| 4,508,570 | 4/1985 | Fujii et al. | 106/20 |
| 4,908,063 | 3/1990 | Baker et al. | 106/22 |
| 4,923,515 | 5/1990 | Koike et al. | 106/22 |
| 4,985,077 | 1/1991 | Ise et al. | 106/22 |
| 5,019,166 | 5/1991 | Schwarz | 106/22 |
| 5,049,188 | 9/1991 | Takimoto et al. | 106/22 |

Primary Examiner—Mark L. Bell
Assistant Examiner—Helen Klemanski
Attorney, Agent, or Firm—Sprung Horn Kramer & Woods

[57] ABSTRACT

Colorant preparations, in particular printing inks, contain compounds of the formula

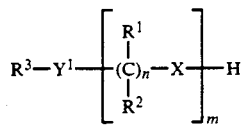

in which the substituents have the meanings given in the description as an additive.

The additive substantially prevents the undesirable "build-up" in printing.

7 Claims, No Drawings

PRINTING INKS

The present invention relates to colorant preparations, such as printing inks, in particular offset printing inks, which contain compounds of the formula

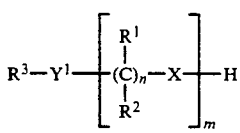 (A)

in which
R$^1$ and R$^2$ independently of one another and independently of each recurring unit, denote H, C$_{1-24}$-alkyl, aryl or C$_{1-24}$-alkaryl,
R$^3$ denotes H, C$_{1-24}$-alkyl, aryl, C$_{1-24}$-alkaryl—where R$^3$ can, if desired, carry 1-3 further substituents from the series comprising —O—R$^1$, —NR$^1$R$^2$ or radicals

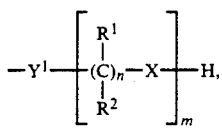

Y$^1$ denotes O, S, NR$^1$,
X, independently of each recurring unit, denotes O, S,

where R$^4$ is H, C$_{1-24}$-alkyl, aryl, C$_{1-24}$-alkyl-aryl or

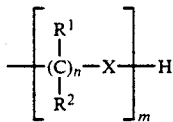

n denotes an integer from 2-4 and
m denotes an integer from 3-450,
and to the use of the compounds (A) as an additive to colorant preparations, in particular printing inks.

The compounds of the structure (A) are polyethers, such as are obtained, for example, by polyalkoxylation of lower alcohols or polyols, such as methanol, ethanol, propanol, butanols, pentanols or hexanols, or phenols, such as, for example, phenol, cresol, nonylphenol, dodecylphenol or phenol/formaldehyde resins for example obtained from phenol, alkyl- or alkylarylphenols and formaldehyde or amines or polyamines, such as, for example, ammonia, butylamine, dibutylamine, ethylenediamine, diethylenetriamine, triethylenetetramine with ethylene oxide, propylene oxide, 1,2- and 2,3-epoxybutane, epichlorohydrin, dodecane oxide, octadecene oxide, or the like. This enables the preparation of block polymers or polymers having a random distribution of the oxalkyl groups, so-called mixed polymers, or even mixed forms. Products of this type are preferably prepared from a mixture of propylene oxide and ethyeene oxide. Polyethers started with alkanols, alkanediols, -triols and -polyols and reacted with propylene oxide and then ethyoxylated with 10–20% by weight (relative to the total amount of polyether) are particularly preferred.

Other suitable polyethers are available by acid-catalysed polymerization of cyclic ethers (ethylene oxide, propylene oxide, oxetane, tetrahydrofuran). An example of such a polyether is poly(tetrahydrofuran). The preparation processes of polyethers of this type are known. These products are commercially available.

Amino-, alkylamino- and dialkylamino-terminated polyethers prepared from the OH-terminated polyethers mentioned by reaction with ammonia or amines are also suitable. These products are also commercially available (for example Jeffamine ™, Texaco).

Polyethers to be used according to the invention are also obtained by chain-lengthening of the hydroxyl- or amino-terminated polyethers mentioned by reaction with di- or polyisocyanates, di- or polycarboxylic acids, formaldehyde, di- or polyglycidyl ethers, and the like (see, from example, EP-A 55,433 and EP-A 55,434).

Preferred polyethers of the structure (A) have an average molecular weight (weight average) of 500 to 100,000 (measured by means of gel permeation chromatography).

The colorant preparations according to the invention, such as printing inks, in particular offset printing inks, in general contain 0.01–20% by weight of compounds (A), it also being possible to use different compounds covered by the general structural formula (A) in a mixture side by side. The amount of compounds (A) in the mixtures according to the invention is preferably selected such that for example, the finished offset printing ink contains 0.1–5, in particular 0.2–2, % by weight of (A), relative to the total weight of the printing ink.

Preference is given to colorant preparations, in particular offset printing inks, of the above description containing compounds of the formula (A) where n is 2, X is O, R$^1$ is H, R$^2$ is H or CH$_3$, Y$^1$ is O and R$^3$ is the radical of a mono-, di-, tri- or tetrafunctional aliphatic alcohol having 2 to 8 C atoms, in particular the radical of an aliphatic diol or triol having 2-12 C atoms and m is 10-100.

Typical examples of additives (A) are (idealised structures):

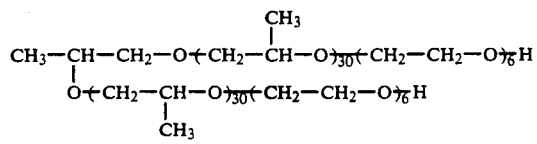 (B)

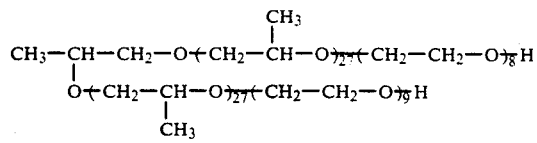
(C)
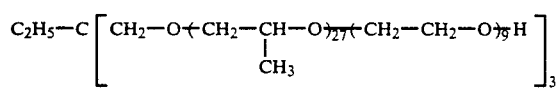
(D)
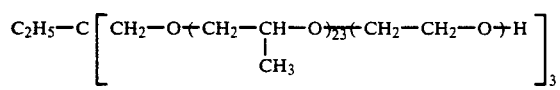
(E)
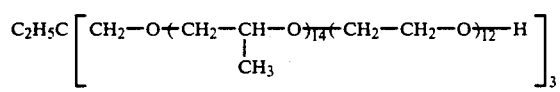
(F)
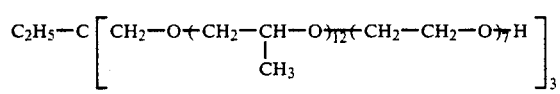
(G)
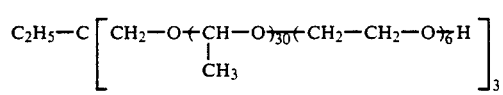
(H)
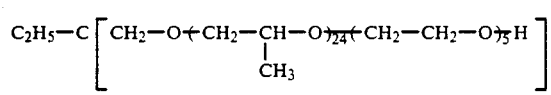
(I)
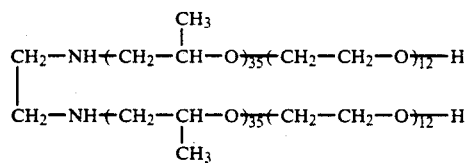
(J)
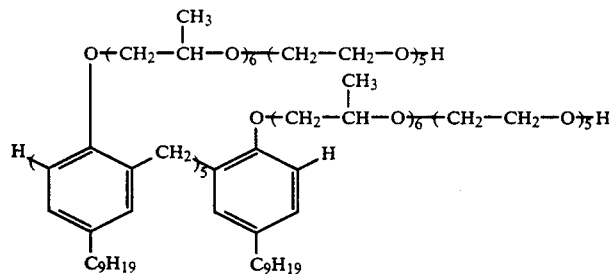
(K)
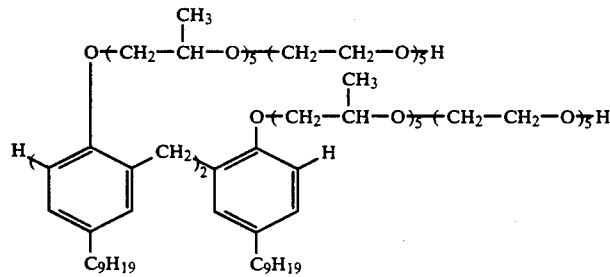
(L)

-continued

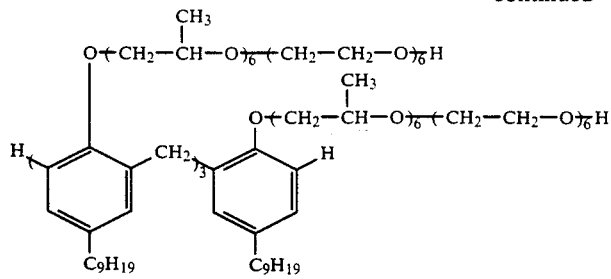
(M)

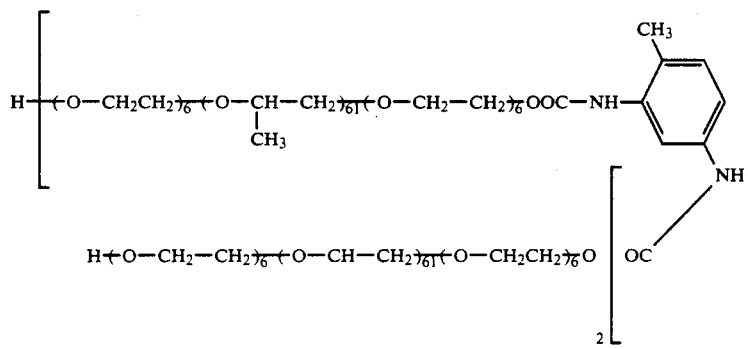
(N)

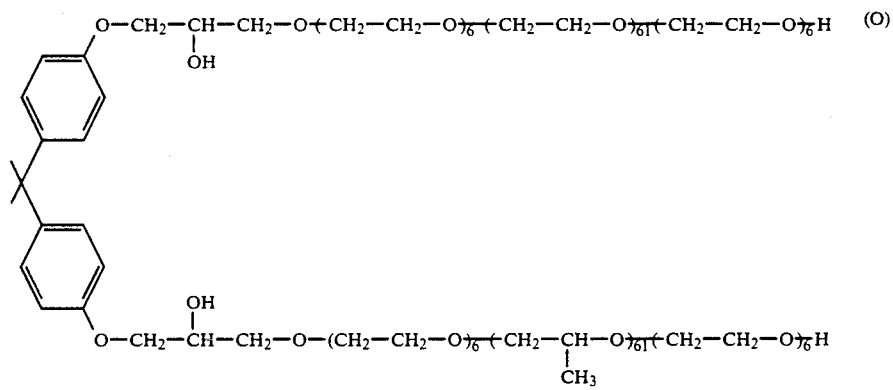
(O)

The offset printing inks according to the invention are suitable for sheet-fed and web offset printing, in particular also for heat-set offset printing.

The colorant preparations, in particular printing inks, for example offset printing inks, consist mainly of varnish, for example alkyd resin and colorants, for example pigments, and, furthermore, the conventional additives, such as mineral oils, siccatives, anti-skinning agents and the like.

Of these, preferred printing inks are those containing, as the colorant, at least one dyestuff which has been obtained by reacting a dyestuff of the formula $F(Y'H)_n$ (I), in which F is a dyestuff radical, Y' is —O—, —S—,

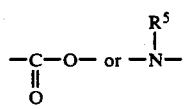

$R^5$ is hydrogen, alkyl, preferably $C_1$-$C_4$-alkyl, cycloalkyl, preferably cyclopentyl and cyclohexyl and n is 1, 2, 3, 4, 5 or 6, with a compound containing at least 1 isocyante group and at least 18 C atoms.

Dyestuffs of this type are described in EP 271,781.

Preferred colorants (mixtures) are obtained by reacting about 3 to about 70% by weight of the dyestuff of the formula $F(Y'H)_n$ (I) with about 97 to about 30% by weight of an isocyanate-containing resin obtainable by reacting a) about 8 to about 35% by weight of a polyalcohol (mixture) having 2-6 OH groups, b) about 15 to about 80% by weight of a monocarboxylic acid or a monocarboxylic acid mixture, c) about 0 to about 50% by weight of aliphatic, cycloaliphatic or aromatic diisocyanate (mixture) whose isocyanate groups have all been converted in the formation of the resin and e) about 9 to about 75% by weight of an aliphatic, cycloaliphatic or aromatic diisocyanate or a mixture of diisocyanates, in which the individual diisocyanates retain, after formation of the resin, on average one unconverted isocyanate group each.

The printing inks according to the present invention preferably contain colorants of the formula

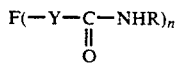
(II)

in which
F is a dyestuff radical,
Y is a direct bond or the radical of a group —Y—H which can form an adduct with the NCO function,
R is an organic radical and
n is 1, 2, 3, 4, 5 or 6, where is n≧2, the radicals

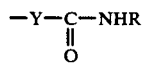

can be identical or different,
with the proviso that the total number of C atoms of the n R radicals is ≧18.

(It should be pointed out that a once given definition of a radical or index is maintained in the text below also in a different context).

Particularly preferred colorants have the formula

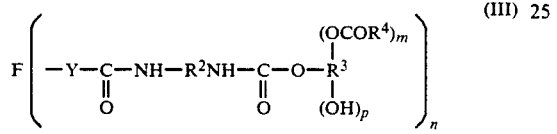
(III)

in which
R², R⁴ represent organic radicals,
R³ represents an aliphatic radical,
m represents 1, 2, 3, 4, 5 and
p represents 0, 1, 2, 3, 4, 5.

Further preference is given to dyestuffs having a structural element

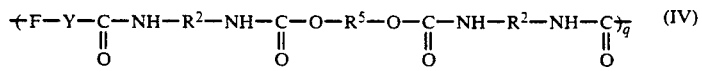
(IV)

in which
R⁵ represents

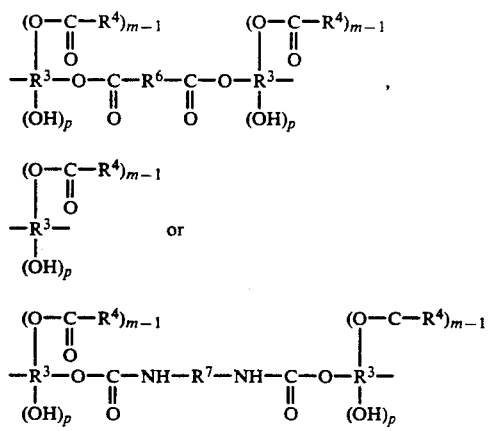

R⁶, R⁷ represent organic radicals and
q represents 2, 3, 4, 5, 6, 7, 8, 9, 10.

R², R⁷ preferably represent alkylene, cycloalkylene or arylene radicals, for example

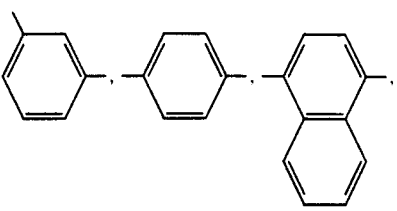

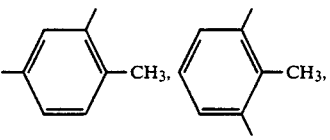

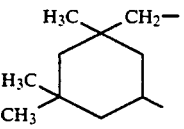

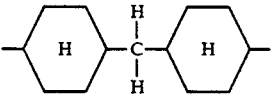

R³ preferably represents an alkyl radical, particularly preferably a C₁-C₈-alkyl radical, which can be interrupted by O atoms and be substituted, for example, by C₁-C₆-alkoxy, and in the case where R³ is derived from a sugar alcohol R³ can also contain a cyclic ether grouping.

R⁴ preferably represents an aliphatic or an aromatic hydrocarbon radical, each of which can have 4–23 C atoms and be substituted, for example, by —OH, —COOH, =O, halogen (chlorine). The aliphatic radical can by acyclic or cyclic, saturated or unsaturated, and the unsaturated radical preferably contains 1-3 double bonds. The aromatic radical is preferably a phenyl radical.

R⁶ preferably represents an aliphatic or an aromatic hydrocarbon radical which may have 1-16 C atoms and each of which can be substituted, for example, by —OH, =O, halogen (chlorine). The alphatic radical preferably contains 1-3 double bonds. The aromatic radical is preferably a phenyl radical.

The dyestuffs F(Y'H)ₙ, from which F is derived, can belong to a wide range of dyestuff classes, for example triarylmethane, oxazine, thiazine, nitro, anthraquinone, coumarin, quinophthalone, benzodifuranone, perylene, naphthalimide, but in particular azo(monoazo), phthalocyanine or the methine series.

In a typical embodiment, the dyestuffs of the formula I were prepared by reacting 1. 3–70% by weight, preferably 3–55% by weight, particularly preferably 20 to 40% by weight, of an organic dyestuff of the formula $F(Y'H)_n$ with
2. 97–30% by weight, preferably 97–45% by weight, particularly preferably 80–60% by weight, of an NCO-functional compound.

This NCO-functional resin (2) should preferably be synthesised from the following components:

($\alpha$) 8–35% by weight, particularly preferably 10–25% by weight, of one or more polyalcohols having 2–6 hydroxyl groups, ($\beta$) 15–80% by weight, particularly preferably 25–70% by weight, of a monocarboxylic acid or a monocarboxylic acid mixture selected from the groups comprising a) substantially unsaturated natural or isomerised natural fatty acid mixtures, b) substantially saturated natural fatty acids or c) synthetic aliphatic, straight-chain or branched fatty acids, d) monocyclic, cycloaliphatic monocarboxylic acids, e) polycyclic, saturated or unsaturated natural (terpenoid) resin acids or those obtained therefrom by isomerisation, hydrogenation or partial dehydrogenation, and f) aromatic, unsubstituted or alkyl-substituted $C_{6-14}$-monocarboxylic acids.

($\gamma$) 0 to 50% by weight, particularly preferably 0 to 35% by weight, of one (or more) aliphatic, cycloaliphatic or aromatic dicarboxylic acid(s) or their esterifiable derivatives.

($\delta$) 0 to 50% by weight, particularly preferably 0 to 35% by weight, of one (or more) aliphatic, cycloaliphatic or aromatic diisocyanate (e) in which essentially both NCO groups have been converted and ($\epsilon$) 9 to 75% by weight, particularly preferably 20 to 60% by weight, of one (or more) aliphatic or cycloaliphatic or aromatic diisocyanates (e), those diisocyanates having two NCO groups of different reactivity being very particularly preferred, with the proviso that the sum of ($\alpha$), ($\beta$), ($\gamma$), ($\delta$) and ($\epsilon$) is 100% and the isocyanates of component ($\epsilon$) on average mainly react with only one of their NCO groups and the second, which may be less reactive, remains essentially unconverted.

The conversion of components ($\alpha$) to ($\epsilon$) to the NCO-functional resin (2) is advantageously carried out in such a manner that first ($\alpha$) is reacted with ($\beta$), ($\gamma$) and ($\delta$) to give an OH-functional precondensation product which is then reacted with ($\epsilon$) to give resin (2). If it is desired to prepare products from natural fatty acids—($\beta$) groups a) and b)—it may be advantageous to use these fatty acids in the form of the oils (triglycerides) occurring in nature and to transesterify the oils with polyalcohols ($\alpha$) by known methods to hydroxyl-functional partial ester intermediates, which can then be reacted with ($\gamma$), ($\delta$) and ($\epsilon$), if desired also directly with ($\epsilon$), to give resin (2).

Examples of suitable polyalcohols (component ($\alpha$)) containing the radical $R^3$ are:

Ethylene glycol, 1,2-propylene glycol, 1,3-propanediol, 1,2-butylene glycol, 2,3-butylene glycol, 1,3-butanediol, 1,4-butanediolo, 1,6-hexanediol, diethylene, trimethylolpropane, pentaerythritol, di-[(2,2-dimethylol)-n-butyl] ether, dipentaerythritol, diglycerol, sugar alcohols, such as xylitol, mannitol, sorbitol, it being necessary to take into account that these alcohols upon esterification with carboxylic acids reduce their average effective funcationality by about 2 due to the formation of cyclic inner ethers.

Examples of monocarboxylic acids $R^4$-COOH (component ($\beta$)) from group a) of drying and semi-drying natural fatty acids or naturally obtained from those by isomerisation are: linseed oil fatty acid, soya bean oil fatty acid, cottonseed oil fatty acid, peanut oil fatty acid, (Kon) juvandol fatty acid, ricinic acid (obtained from natural castor oil or ricinoleic acid by dehydration), oiticica oil fatty acid, tallow oil fatty acid, safflower oil fatty acid.

An example of monocarboxylic acids ($\beta$) $R^4$-COOH from group b) of the essentially saturated natural fatty acids is coconut fatty acid. The fatty acid cuts obtained from natural fatty acid mixtures, for example by fractionation, and mainly containing $C_{22}$-monocarboxylic acid (behenic acid), $C_{18}$-monocarboxylic acid (stearic acid) or $C_{16}$-monocarboxylic acid (palmitic acid), in addition to acids of higher and lower C number, may also be mentioned here as examples.

Examples of monocarboxylic acids ($\beta$) $R^4$-COOH from group c) of synthetic saturated fatty acids are isooctanoic acid, isononanoic acid and isotridecanoic acid.

Typical monocarboxylic acids ($\beta$) $R^4$-COOH from group d) of the cycloaliphatic, saturated or olefinically unsaturated monocarboxylic acids are the $C_6$- and $C_7$-carboxylic acids cyclopenanecarboxylic acid, cyclohexanecarboxylic acid, 1,4,5,6-tetrahydrobenzoic acid.

Examples of monocarboxylic acids ($\beta$) $R^4$-COOH from group e) of the unsubstituted or substituted aromatic monocarboxylic acids are benzoic acid, 3-methylbenzoic acid, 4-methylbenzoic acid, 4-tert.-butylbenzoic acid, 4-chlorobenzoic acid, anisic acid.

Examples of monocarboxylic acids ($\beta$) $R^4$-COOH from group f) of resinous acids and rosin derivatives are abietic acid, dehydroabietic acid, neoabietic acid, pimaric acid, isopimaric acid, laevopimaric acid, and the like.

Examples of suitable dicarboxylic acids ($\gamma$) according to HOOC—$R^6$—COOH and esterifiable derivative thereof are succinic acid (anhydride), glutaric acid (anhydride), adipic acid, pimelic acid, azelaic acid, suberic acid, sebacic acid, dodecanedoic acid, cyclohexane-1,2-dicarboxylic acid (anhydride), 1,2,3,6-tetrahydrophthalic acid (anhydride), phthalic acid (anhydride), isophthalic acid. Possible but less preferred examples are unsaturated aliphatic acids, such as fumaric acid, maleic acid (anhydride), itaconic acid.

In the case that the printing ink according to the invention contains a colorant (mixture) and possibly one or more additives but no varnish, the colorant of the formula II is a dyestuff-modified resin, i.e. the dyestuff has been incorporated chemically in the varnish.

However, the printing inks according to the invention preferably contain the colorant of the formula II admixed with a varnish. The varnish contains, for example, alkyd resins, urethane alkyds, hard resins, linseed stand oils and mineral oils, which can be mixed together or boiled.

The printing inks according to the invention can be used for printing in a known manner.

The offset printing inks can be used by conventional processes for sheet-fed and web offset printing, but preferably for heat-set offset printing. This makes it possible to produce four-colour prints using suitable black pigments (carbon black) and the three trichromatic hues, in which all three hues (magenta, cyan, yellow) are produced by means of the dyestuffs used according to the invention. However, it is also possible to produce only two hues, preferably yellow and magenta, using the dyestuffs used according to the invention. Finally, it is also possible to use one or more hues, printing ink pigments and the dyestuffs used according to the invention side by side.

The joint use of dyestuffs according to the present invention and pigments in printing inks can be advantageous, for example, when the aim is to obtain particularly homogeneous large-area printing, to shade a printing ink, to improve a pigment print with respect to brilliance, increase the transparency of a pigment print, improve the properties of carbon black in four-colour printing with respect to brilliance and gloss and transparency or to improve the rheology of conventional sheet-fed or web offset printing inks.

Since full compatibitility with conventional book and offset printing inks based on pigments is given, the colorants of the formula II used according to the invention can be added in any desired ratio.

Accordingly, the invention also relates to printing inks, in particular book and offset printing inks containing a colorant (mixture), if appropriate a varnish and if appropriate one or more additives, such as siccatives, anti-skinning agents and flow-improving agents, characterised in that the colorant (mixture) contains at least one dyestuff of the formula I in addition to a pigment or carbon black.

In what follows, a few dyestuff types of the formula $F(Y'H)_n$ preferably used for preparing the colorants of the formula II are listed by way of examples.

A. Pyridoneazo dyestuffs containing 1–4 hydroxyl groups and having the formula

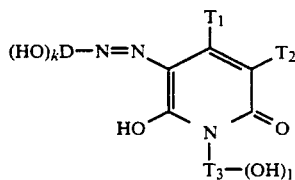

V in which

D represents the radical of a diazo component, $T_1$ represents alkyl, aryl, —COOT$_4$, $T_2$ represents H, —CN, —COOT$_4$, —CONH—T$_5$-(OH)$_l$ $T_3$ represents aliphatic or araliphatic radicals which can be interrupted by one or more oxygen atoms, $T_4$ represents hydrogen, alkyl, $T_5$ represents aliphatic or araliphatic radicals which can be interrupted by one or more oxygen atoms, k, l represent 0, 1, 2, 3 or 4, with the proviso that the sum of k+l is 1, 2, 3 or 4.

D preferably represents a phenyl radical which may carry 1–4 substituents from the series of unsubstituted or substituted $C_1$–$C_{12}$-alkyl, $C_2$–$C_{12}$-alkenyl, cyclohexyl, cyclopentyl, cyclohexenyl, halogen, such as Cl, Br, F, $C_1$–$C_6$-alkoxy, substituted or unsubstituted phenoxy, —CN, —CF$_3$, —NO$_2$, substituted or unsubstituted $C_1$–$C_{18}$-alkylsulphonyl, substituted or unsubstituted phenylsulphonyl, substituted or unsubstituted benzylsulphonyl, substituted or unsubstituted phenoxysulphonyl, substituted or unsubstituted carbamoyl, and substituted or unsubstituted sulphamoyl.

The alkyl radicals in $C_1$–$C_{12}$-alkyl and $C_1$–$C_{18}$-alkylsulphonyl can be substituted, for example, by —OH, $C_1$–$C_6$-alkoxy or —CN. The phenyl radicals in phenoxy, phenylsulphonyl, phenoxysulphonyl and benzylsulphonyl can be substituted, for example, by $C_1$–$C_4$-alkyl or halogens, such as Cl and Br.

The carbamoyl groups preferably carry two identical or different substituents from the series comprising $C_1$–$C_{18}$-alkyl which can be substituted, for example, by —OH, $C_2$–$C_{18}$-alkenyl, aryloxyalkyl, $C_9$–$C_{11}$-aralkyloxyalkyl, $C_7$–$C_{11}$-aralkyl, $C_4$–$C_{13}$-acyloxyalkyl, $C_6$–$C_{14}$-alkoxycarbonyloxyalkyl, $C_6$–$C_{12}$-alkylaminocarbonyloxyalkyl, $C_4$–$C_9$-dialkylaminoalkyl, suitable diazo components being disclosed in DE-A-1,311,648.

The sulphamoyl groups preferably carry 1 or 2 substituents from the series comprising the letter two being $C_1$–$C_{18}$-alkyl, $C_1$–$C_{12}$-alkyl or $C_7$–$C_{11}$-aralkyl, each uninterrupted or interrupted by O and unsubstituted or substituted by hydroxyl or phenoxy; suitable diazo components have been disclosed in EP-A 118,567.

Examples of diazo components are:

Aniline, o-, m- and p-toluidine, o- and p-ethylaniline, 2,3-dimethylaniline, 3,4-dimethylaniline, 2,4-dimethylaniline, 2,5-dimethylaniline, o-i-propylaniline, p-i-propylaniline, 2,4,5- and 2,3,5-trimethylaniline, 2-methyl-5-i-propylaniline, 4-tert.-butylaniline, 4-sec.-butylaniline, aniline which is substituted in the o- or p-position by straight-chain or branched $C_{12}$–$C_{25}$-alkyl, 4-cyclohexylaniline, 4-cyclohexyl-2-methylaniline, 4-(1-cyclohexen-1-yl)-aniline, o-, m- and p-chloroaniline, 2,3-, 2,4-, 2,5- and 3,4-dichloroaniline, 5-chloro-2-methylaniline, 4-chloro-2-methylaniline, 3-chloro-2-methylaniline, 2-chloro-5-methylaniline, 4-chloro-3-methylaniline, 3-chloro-4-methylaniline, 2-chloro-3,4-dimethylaniline, 5-chloro-2,4-dimethylaniline, 4-chloro-2,5-dimethylaniline, o-, m- and p-nitroaniline, 2-chloro-4-nitroaniline, 2-nitro-4-chloroaniline, 2-methyl-4-nitroaniline, 4-methyl-2-nitroaniline, 2,4-dimethyl-5-nitroaniline, 2,5-dimethyl-4-nitroaniline, 4-i-propyl-2-nitroaniline, 4-tert.-butyl-2-nitroaniline, 4-cyclohexyl-2-nitroaniline, o-, m- and p-methoxyaniline, 2-ethoxy-and 4-ethoxyaniline, 2-phenoxyaniline, 2-(2-methylphenoxy)-aniline, 5-chloro-2-methoxyaniline, 5-chloro-2-phenoxyaniline, 5-chloro-2-(4-chlorphenoxy)aniline, 4,5-dichloro-2-methoxyaniline, 2-methoxy-5-nitroaniline, 2-methoxy-4-nitroaniline, 3-chloro-4-methoxyaniline, 4-methoxy-2-nitroaniline, 4-ethoxy-2-nitroaniline, 4-ethoxy-3-nitroaniline, 3-methoxy-4-methylaniline, 4-methoxy-2-methylaniline, 2-methoxy-5-methylaniline, 2-ethoxy- 5-methylaniline, 4-chloro-2-methoxy-5-methylaniline, 4-chloro-2,5-dimethoxyaniline, 2,5-dimethoxy-4-nitoraniline, 2-(phenylsulphonyl)-aniline, 2-(methylsulphonyl)-4-nitroaniline, 2-methoxy-5-(phenylsulphonyl)aniline, 5-(benzylsulphonyl)-2-methoxyaniline, 5-(ethylsulphonyl)-2-methoxaniline.

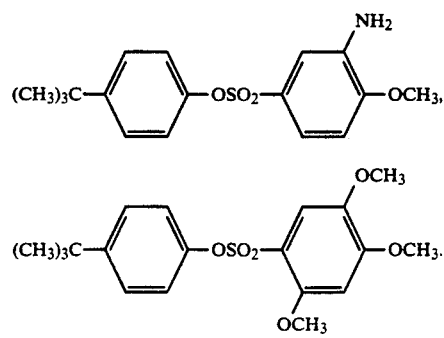

In the case that k in formula (V) is >0, i.e. the diazo component has 1-4 hydroxyl groups, D preferably represents a phenyl radical which can be substituted by hydroxy-$C_1$-$C_{18}$-alkoxy, —$NO_2$, —CN, F, Cl, Br, $C_1$-$C_4$-alkyl, or represents a radical of the formulae

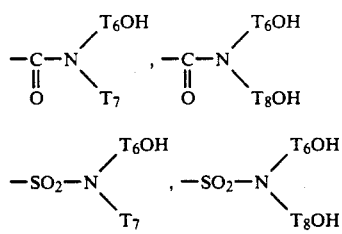

in which
T$_6$, T$_8$ represent aliphatic radicals which can be interrupted by one or more O atoms and
T$_7$ represents hydrogen or aliphatic or araliphatic radicals which can be interrupted by one or more O atoms.

It is likewise possible to use dyestuffs which, together with the diazo components listed under formula V, contain coupling components from the pyrimidone, pyrazolone, aminopyrazole or indole series.

B. Aminoazobenzene dyestuffs of the formula

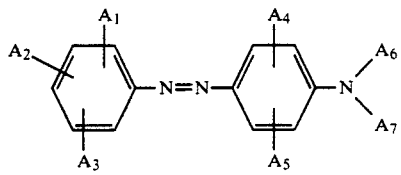 (VI)

in which
$A_1$, $A_2$, $A_3$ are hydrogen, halogen, such as Cl, Br, F, —CN, —$NO_2$, $C_1$-$C_6$-alkyl, methoxy and ethoxy, substituted or unsubstituted phenoxy, substituted or unsubstituted $C_1$-$C_{18}$-alkylsulphonyl, substituted or unsubstituted phenylsulphonyl, substituted or unsubstituted phenylazo, $C_1$-$C_6$-alkoxycarbonyl, —$CF_3$, —SCN, $C_1$-$C_{12}$-alkylmercapto, $C_1$-$C_6$-alkylcarbonyl, substituted or unsubstituted phenylcarbonyl, —OH, $A_4$, $A_5$ represent hydrogen, halogen, such as Cl, Br, F, substituted or unsubstituted $C_1$-$C_6$-alkyl, in particular methyl and ethyl, substituted or unsubstituted $C_1$-$C_6$-alkoxy, in particular methoxy and ethoxy, substituted or unsubstituted —NH—CO—$C_1$-$C_6$-alkyl, in particular —NH—CO—$CH_3$ and —NH—CO—$C_2H_5$, substituted or unsubstituted —NH—$SO_2$—$C_1$-$C_6$-alkyl, in particular —NH—$SO_2$—$CH_3$ and —NH—$SO_2$—$C_2H_5$, $A_6$, $A_7$ independently of one another, represent hydrogen, substituted or unsubstituted $C_1$-$C_{12}$-alkyl or $C_3$-$C_{12}$-cycloalkyl, substituted, for example, by —OH, —$NH_2$, —CN, or radicals of the formulae

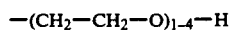

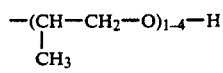

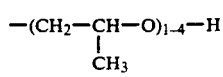

with the proviso that the dyestuff contains at least one substituent reactive with an isocyanate.

The following compounds of the formula VI are preferably used:
1. Compound in which

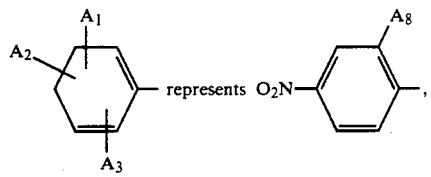

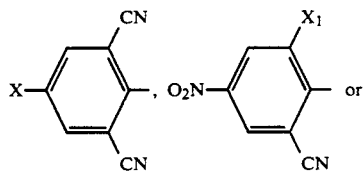

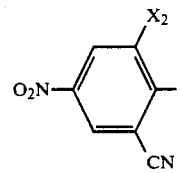

in which $A_8$ represents Cl, Br, CN,
X represents H, $CH_3$, $C_2H_5$, $C_6H_{12}$, tert.-butyl, $C_1$-$C_4$-alkoxy, Cl, Br,
$X_1$ represents —$NO_2$, —CN, —$CF_3$, $C_1$-$C_{12}$-alkylsulphonyl and
$X_2$ represents —$NO_2$, —CN.

2. Compounds in which

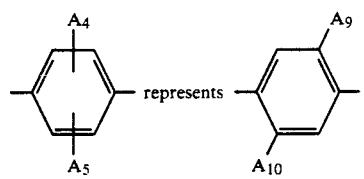

in which
$A_9$ represents hydrogen, chlorine, $C_1$-$C_4$-alkyl, in particular methyl and ethyl, and $C_1$-$C_4$-alkoxy, in particular methoxy or ethoxy, and
$A_{10}$ represents hydrogen, halogen, such as Cl, Br, F, substituted or unsubstituted $C_1$-$C_6$-alkyl, in particular methyl and ethyl, substituted or unsubstituted alkoxy, in particular methoxy and ethoxy, substituted or unsubstituted —NH—CO—$C_1$-$C_6$-alkyl, in particular —NH—CO—$CH_3$ and —NH—CO—$C_2H_5$, substituted or unsubstituted —NH—$SO_2$—$C_1$-$C_6$-alkyl, in particular —NH—$SO_2$—$CH_3$ and —NH—$SO_2$—$C_2H_5$.

It is likewise possible to use dyestuffs of the formula

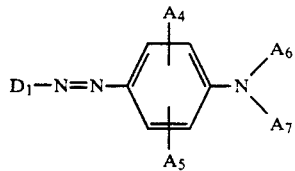    VII in which
D₁ is the radical of a diazo component from the thiophene, thiazole, thiadiazole, benzothiazole or benzisothiazole series.

C. Methine dyestuffs of the formula

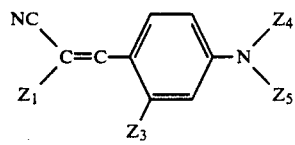    VIII in which
$Z_1$ represents —CN, —COOCH₃, —COOC₂H₅, —COOC₂H₄OH, —SO₂CH₃, —SO₂C₂H₅, —SO₂C₂H₄OH,
$Z_2$ represents H, CN,
$Z_3$ represents C₁-C₆-alkyl,
$Z_4$ represents C₁-C₆-alkyl, hydroxy-C₁-C₆-alkyl, phenyl, benzyl and
$Z_5$ represents hydroxy-C₁-C₆-alkyl.

D. Copper phthalocyanine dyestuffs of the formula

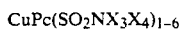    IX in which
$X_3$ represents hydrogen, C₁-C₆-alkyl, hydroxy-C₁-C₆-alkyl, amino-C₁-C₆-alkyl and
$X^4$ represents hydroxy-C₁-C₆-alkyl and amino-C₁-C₆-alkyl.

E. Rhodamine dyestuffs of the formula

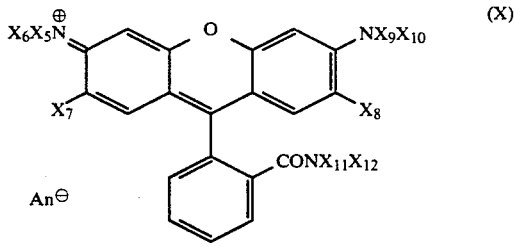    (X)

in which
$X_5$, $X_7$, $X_8$, $X_9$ represent hydrogen, unsubstituted or hydroxyl-substituted C₁-C₆-alkyl,
$X_6$, $X_{10}$ represent unsubstituted or hydroxyl-substituted C₁-C₆-alkyl,
$X_{11}$ represents hydrogen, unsubstituted or hydroxyl-substituted C₁-C₆-alkyl,
$X_{12}$ represent hydroxy-C₁-C₆-alkyl and
An⊖ represents an anion.

Individual examples of dyestuffs of the formula F(Y'H)ₙ are:

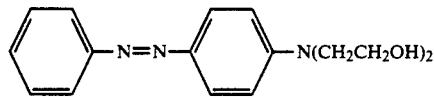

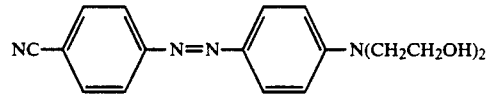

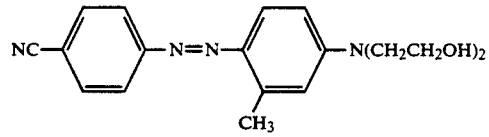

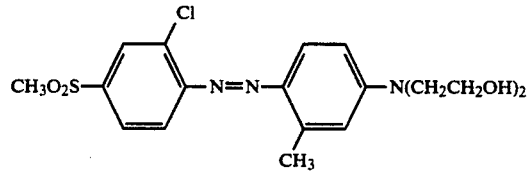

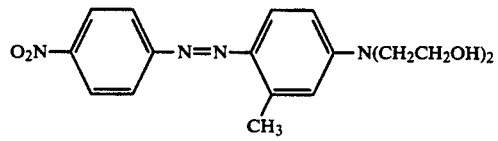

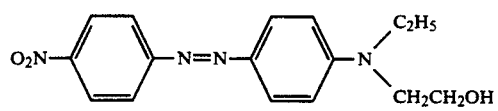

-continued
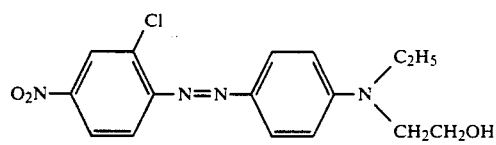
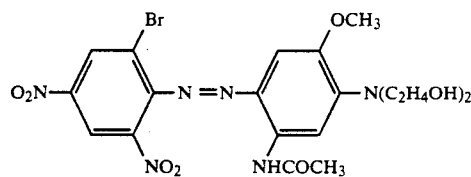
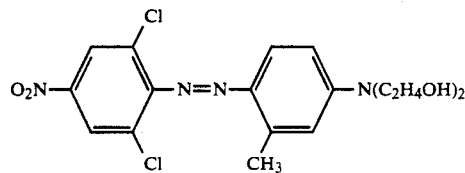
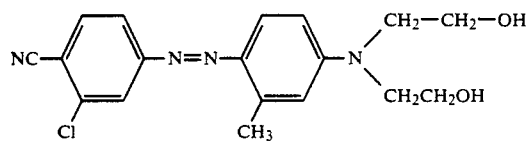
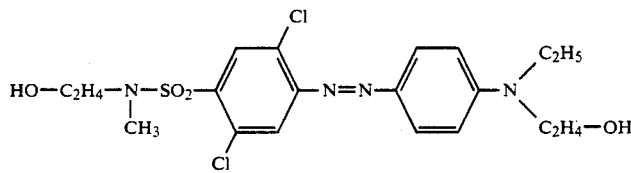
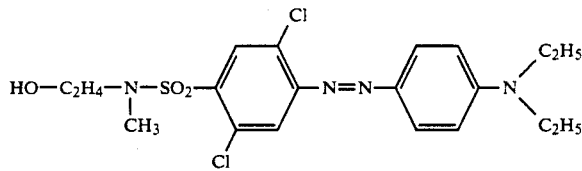
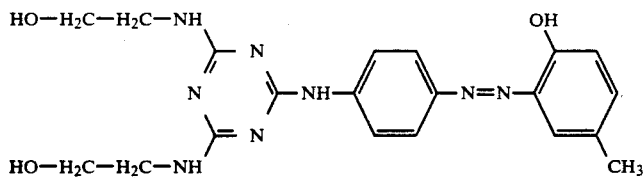
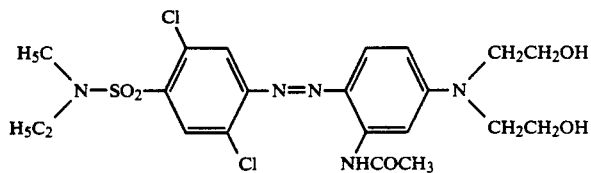
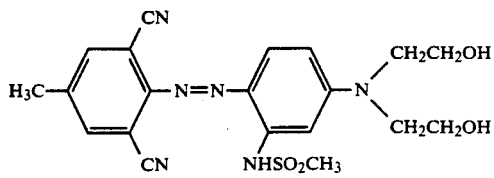

-continued
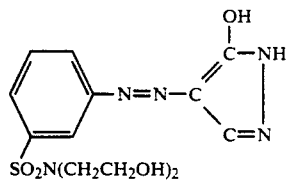
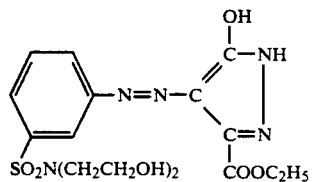
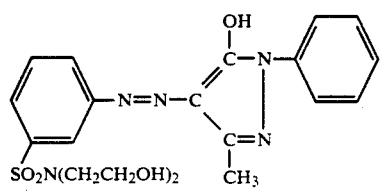
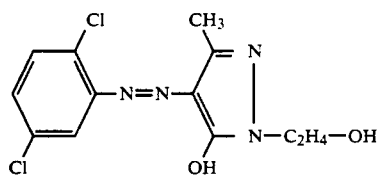
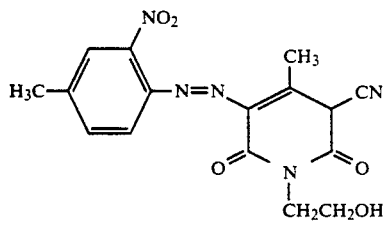
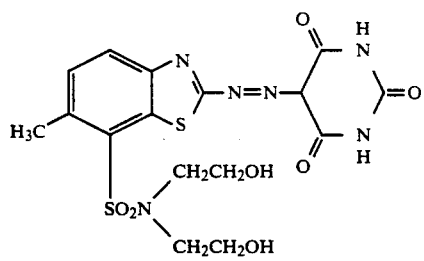
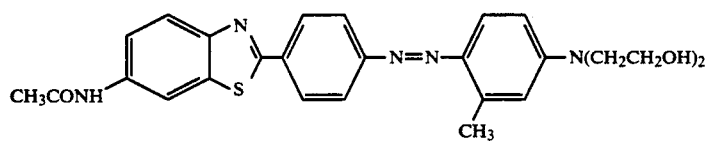
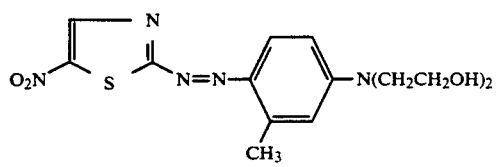

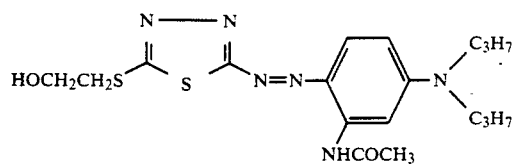
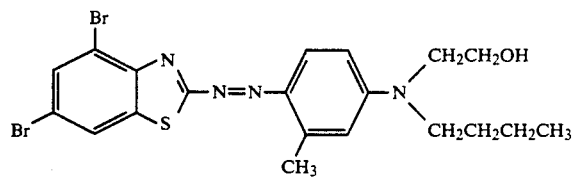
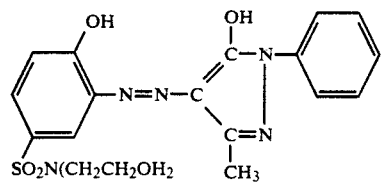
Complex chromium compounds comprising 1 mol of Cr and 2 mol of the dyestuff of the formula
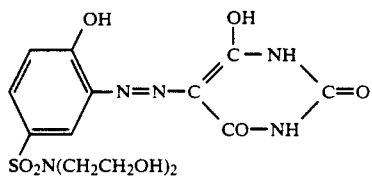
Complex chromium compound comprising 1 mol of Cr and 2 mol of the dyestuff of the formula
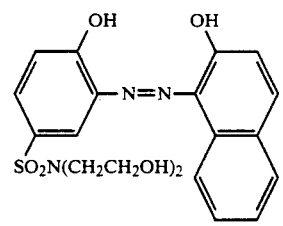
Complex cobalt compound comprising 1 mol of Co and 2 mol of the abovementioned dyestuff.
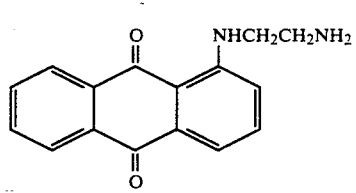
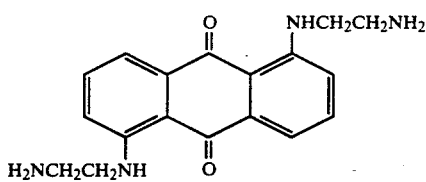
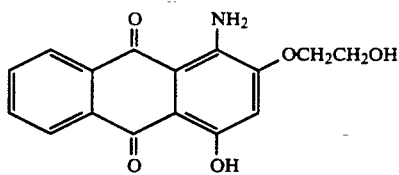
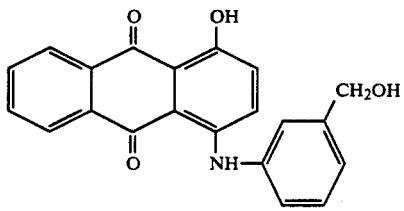

-continued
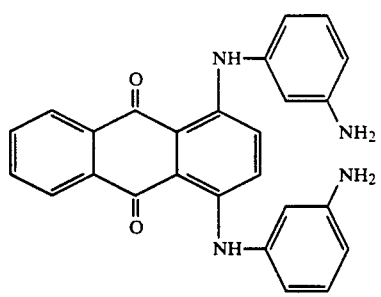
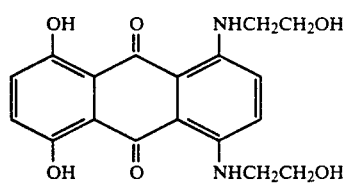
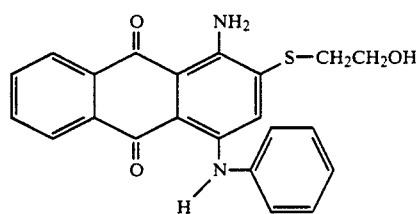
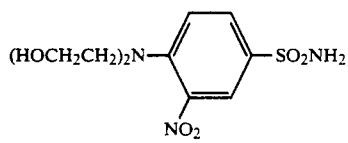
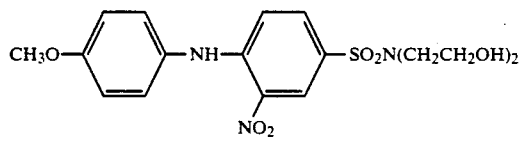
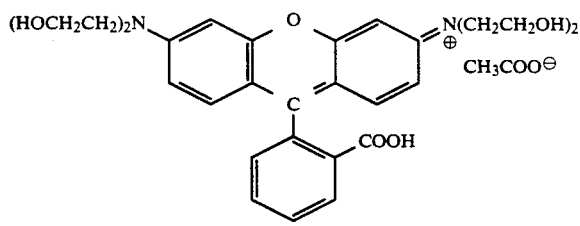
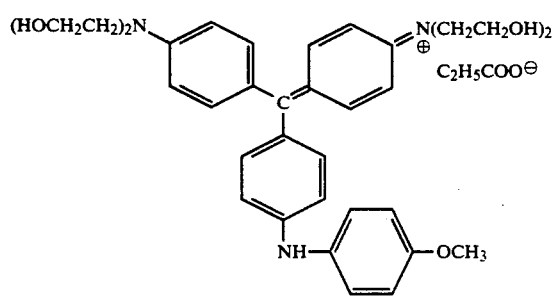

-continued
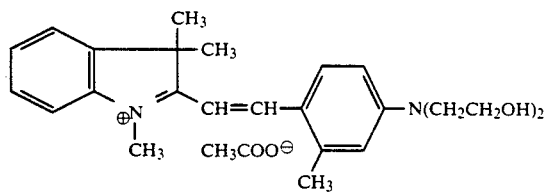
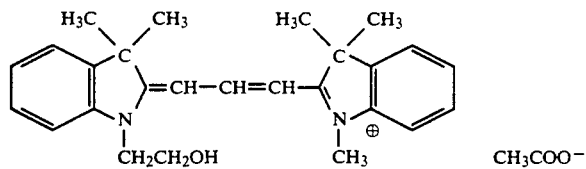
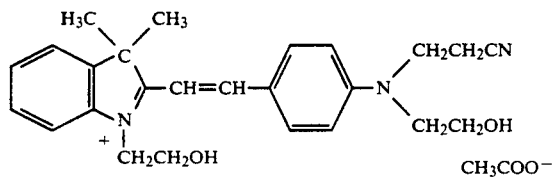
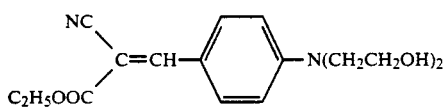
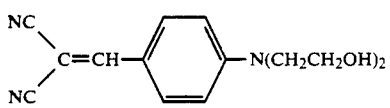
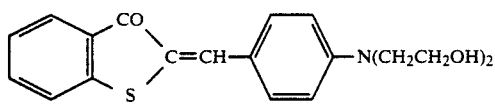
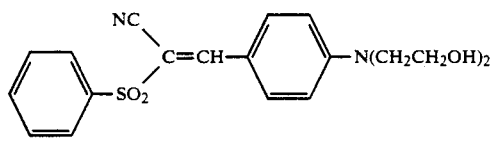
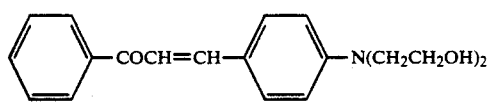
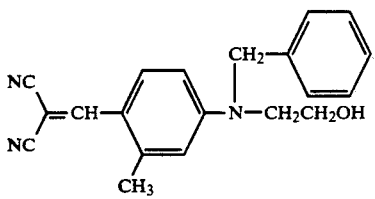
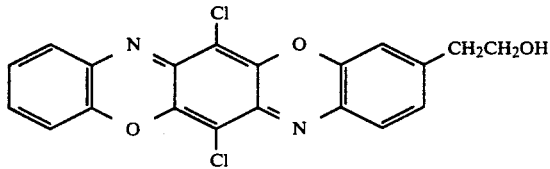

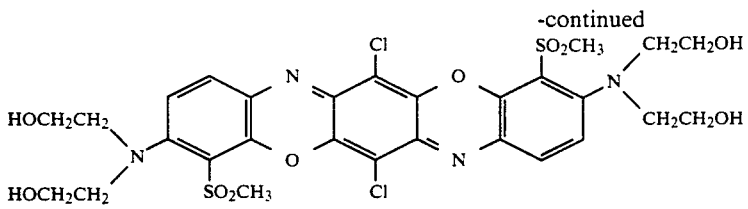

The colorants according to the invention, in particular printing inks, such as offset printing inks, show no or much less "build-up" of the printing ink on the rollers in contrast to the known printing inks which do not contain compounds (A), which allows trouble-free printing of large numbers of copies.

Examples (parts are parts by weight, % are % by weight)

1. Preparation example of the colorant (according to EP 271,781)

1a) Step 1: OH-functional precursor 544 parts of pentaerythritol and 3360 parts of soya bean oil fatty acid were heated to 140° C. over a period of 1 hour and then to 220° C. over a period of 8 hours, while passing through nitrogen and distilling off the water of the reaction. After 11 hours at 220° C., the acid number was <1 mg of KOH/g; the OH number was 58.5 mg of KOH/g.

1b) Step 2: NCO-functional precursor 479.5 parts of precursor 1a) and 87 parts of 2,4-diisocyanatotoluene were reacted with one another at 80° C. for 1 hour under $N_2$. The free isocyanate group content was then 3.6%.

1c) Step 3: Colorant 177.5 parts of precursor 1b), 51.4 parts of the yellow azo dyestuff of the formula

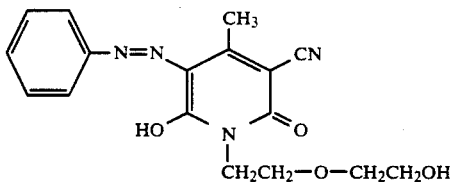

and 0.23 part of dibutyltin dilaurate are reacted with one another at 120° C. for 12 hours under $N_2$. The initially finely divided undissolved dyestuff goes into solution during this time in the melt, gradually becoming more homogeneous. The finished product is a clear, glass-like to slightly adhesive homogeneous material.

2. Preparation example of the colorant (according to EP 271,781)

2a) Step 1: OH-functional precursor 816 parts of pentaerythritol, 2134 parts of stearic acid and 1251 parts of linseed oil fatty acid were heated to 140° C. over a period of 1 hour and then to 220° C. over a period of 8 hours, while passing through nitrogen and distilling off the water of the reaction. After 4 hours at 223° C., the acid number was 4 mg of KOH/g; the OH number 160 mg of KOH/g. The batch was cooled to 120° C. and the amount removed was such that 1136 parts remained in the reaction vessel; 246 parts of tetrahydrophthalic anhydride were added thereto and the mixture was stirred at 120° C. for 1 hour. After that, the acid number was 68 mg of KOH/g and the OH number 60 mg of KOH/g.

2b) Step 2: NCO-functional precursor 431.5 parts of precursor 2b and 104.4 parts of 2,4-diisocyanatotoluene were reacted with one another at 100° C. for 3 hours under $N_2$. The free isocyanate group content was then 4.7%.

2c) Step 3: Colorant 348.1 parts of precursor 2b), 187.5 parts of the azo dyestuff of the formula

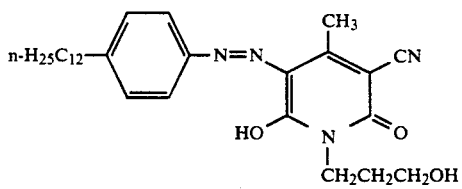

and 0.54 part of dibutyltin dilaurate were reacted with one another at 120° C. for 12 hours under $N_2$. The finely divided, initially undissolved dyestuff goes into solution in the melt during this time. The finished product is homogeneous.

3. Preparation example of the colorant (according to EP 271,781)

1680 parts of soya bean oil fatty acid and 402 parts of trimethylolpropane were heated to 140° C. over a period of 1 hour and then to 220° C. over a period of 8 hours, while passing through nitrogen and distilling off the water of the reaction. After 4 hours at 220° C., the acid number was 4 mg of KOH/g, the OH number 85 mg of KOH/g.

3b) Step 2: NCO-functional precursor 393.7 parts of precursor 3a) and 104.4 parts of 2,4-diisocyanatotoluene were reacted with one another at 80° C. for 1 hour under $N_2$. The free isocyanate group content was then 5.18%.

3c) Step 3: Colorant 413.4 parts of precursor 3b), 171.2 parts of the yellow azo dyestuff of the formula

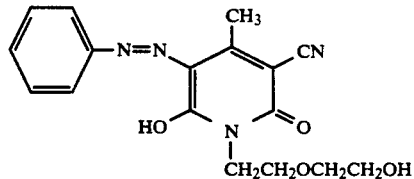

and 0.58 part of dibutyltin dilaurate were reacted with one another at 120° C. for 12 hours under $N_2$. The product is a homogeneous, glass-like material.

4. Preparation example of the colorant (according to EP 271,781)

4a) Step 1: OH-functional precursor 680 parts of pentaerythritol, 2800 parts of soya bean oil fatty acid and 610 parts of benzoic acid were heated to 140° C. over a period of 1 hour and then to 220° C. over a period of 8 hours, while passing through nitrogen and distilling off the water of the reaction. After 13 hours at 220° C., the acid number was 5 mg of KOH/g, the OH number 81 mg of KOH/g.

4b) Step 2: NCO-functional precursor 172.1 parts of precursor 4a) and 43.5 parts of 2,4-diisocyanatotoluene were reacted with one another at 80° C. for 1 hour under $N_2$. The free isocyanate group content was then 4.85%.

4c) Step 3: Colorant 138.6 parts of precursor 4b), 54.8 g of the yellow azo dyestuff

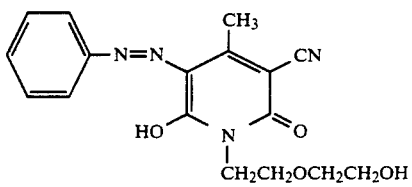

and 0.2 parts of dibutyltin dilaurate were reacted with one another at 120° C. for 12 hours under $N_2$. The product is a homogeneous, glass-like material.

5. Preparation example of the colorant (according to EP 271,781)

5a) Step 1: OH-functional precursor

The same precursor as in Preparation Example 3a) was prepared.

5b) Step 2: NCO-functional precursor

The analogous NCO-functional precursor was prepared from precursor 5a) (=3a) as in Preparation Example 3b), NCO content 4.92%.

5c) Step 3: Colorant 384.1 parts of precursor 5b), 177.9 parts of the yellow azo dyestuff

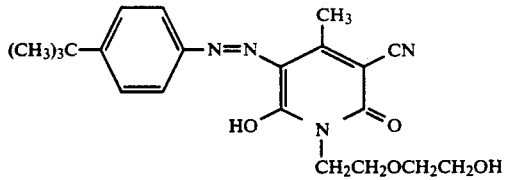

and 0.56 part of dibutyltin dilaurate were reacted with one another at 120° C. for 12 hours under $N_2$. The product is a homogeneous, glass-like material.

6. Preparation example of the colorant (according to EP 271,781)

6a) Step 1: OH-functional precursor

The same precursor as in Preparation Example 3a) is prepared.

6b) Step 2: NCO-functional precursor

The analogous NCO-functional precursor is prepared from precursor 6a) (=3a) as in Preparation Example 3b), NCO content 5.00%.

6c) Step 3: Colorant 175.8 parts of precursor 6b), 53.5 parts of the yellow azo dyestuff

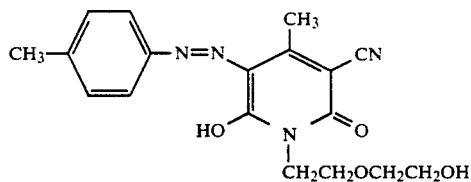

and 0.18 part of dibutyltin dilaurate were reacted at 120° C. for 12 hours under $N_2$. The product is a homogeneous, viscous material.

7. Preparation example of the colorant (according to EP 271,781)

7a) Step 1: OH-functional precursor 335 parts of trimethylolpropane and 1120 parts of soya bean oil fatty acid were heated to 140° C. over a period of 1 hour and then to 220° C. over a period of 8 hours, while passing through nitrogen and distilling off the water of the reaction. After 1 hour at 220° C., the acid number was 6 mg of KOH/g. The batch was cooled to 100° C.; at this temperature, 73 parts of adipic acid were added. The mixture was then heated again at 220° C. After 4 hours at 220° C., the acid number was 5 mg of KOH/g, the OH number 92 mg of KOH/g.

7b) Step 2: NCO-functional precursor 304.9 parts of precursor 7a) and 87 parts of 2,4-diisocyanatotoluene were reacted with one another at 80° C. for 1.5 hours under $N_2$. After that, the free NCO group content was 5.1%.

7c) Step 3: Colorant 312.9 parts of precursor 7b), 130.1 parts of the yellow azo dyestuff of the formula

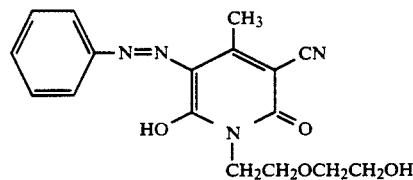

and 0.44 part of dibutyltin dilaurate were reacted with one another at 125° C. for ½ hour and then at 140°–145° C. for ¾ hour. The finished product was a wax-like solid material at room temperature.

8. Preparation example of the colorant (according to EP 271,781)

8a) Step 1: OH-functional precursor 335 parts of trimethylolpropane and 980 parts of soya bean oil fatty acid were heated to 140° C. over a period of 1 hour and then to 220° C. over a period of 8 hours, while passing through nitrogen and distilling off the water of the reaction. After 1 hour at 220° C., the acid number was 6.6 mg of KOH/g. The reaction batch was cooled to 100° C.; at this temperature, 109.5 parts of adipic acid were added. After that, the mixture was again heated to 220° C. After 5 hours at 220° C., the acid number was 5 mg of KOH/g, the OH number 98 mg of KOH/g.

8b) Step 2: NCO-functional precursor 343.5 parts of precursor 8a) and 104.4 parts of 2,4-diisocyanatotoluene were reacted with one another at 80° C. for 1 hour under $N_2$. After that, the free NCO group content was 5.5%.

8c) Step 3: Colorant 290.2 parts of precursor 8b), 130.1 parts of the yellow azo dyestuff

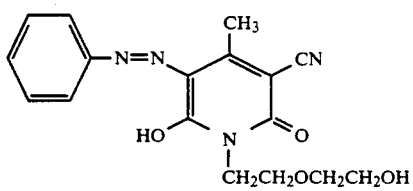

and 0.42 part of dibutyltin dilaurate were heated together with 42 parts of oil of paraffin hydrocarbon fraction 6/9 (mineral oil distillate of boiling point range 260°–290° C.) as diluent at 145° C. for 1 hour. After that, the product was homogeneous; after cooling to room temperature, it became a wax-like solid material.

9. Preparation example of the colorant (according to EP 271,781)

9a) Step 1: OH-functional precursor 335 parts of trimethylolpropane and 1260 parts of soya bean oil fatty acid were heated to 140° C. over a period of 1 hour and then to 220° C. over a period of 8 hours, while passing through nitrogen and distilling off the water of the reaction. After 1 hour at 220° C., the acid number was 8 mg of KOH/g. The batch was cooled to 100° C.; at this temperature, 36.5 parts of adipic acid were added. After that, the mixture was again heated to 220° C. After 4½ hours at 220° C., the acid number was 5 mg of KOH/g, and the OH number 86 mg of KOH/g.

9b) Step 2: NCO-functional precursor 328.1 parts of precursor 9a) and 87 parts of 2,4-diisocyanatotoluene were reacted with one another at 80° C. for ¾ hours under $N_2$. After that, the free NCO group content was 4.64%.

9c) Step 3: Colorant 325.9 parts of precursor 9b), 123.2 parts of the yellow azo dyestuff

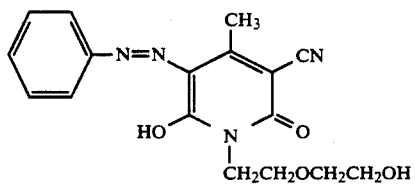

and 0.45 part of dibutyltin dilaurate were reacted with one another at 120° C. for 1 hour. After that, the product was homogeneous; after cooling to room temperature, it became a wax-like solid material.

10) to 31) Examples according to the invention

According to the table below, colorants of Preparation Examples 1–9 were mixed with additives according to formula (A), selecting the idealised structures (B) to (O) shown as examples.

TABLE

| Example according to the invention No. | Colorant from Prep. Ex. No. | Additive accord. to formula: | Amount of additive, relative to colorant (% by weight) |
|---|---|---|---|
| 10 | 1 | (O) | 8 |
| 11 | 2 | (B) | 0.25 |
| 12 | 2 | (B) | 0.5 |
| 13 | 2 | (B) | 8 |
| 14 | 2 | (I) | 8 |
| 15 | 2 | (N) | 8 |
| 16 | 3 | (B) | 1 |
| 17 | 3 | (B) | 2 |
| 18 | 3 | (B) | 4 |
| 19 | 3 | (B) | 8 |
| 20 | 3 | (B) | 12 |
| 21 | 3 | (B) | 16 |
| 22 | 3 | (H) | 8 |
| 23 | 3 | (O) | 8 |
| 24 | 4 | (B) | 8 |
| 25 | 4 | (O) | 8 |
| 26 | 5 | (O) | 8 |
| 27 | 6 | (B) | 0.5 |
| 28 | 6 | (B) | 2 |
| 29 | 7 | (B) | 1 |
| 30 | 8 | (B) | 1 |
| 31 | 9 | (B) | 1 |

All examples according to the invention can be mixed with commercially available sheet-fed and web-fed letterpress and offset printing varnishes and mineral oils.

Testing and printing should be carried out using, for example, a recipe of the following composition: 56 parts by weight of a 50% strength solution of a commercially available web offset varnish based on a long-oil linseed oil alkyd resin and a resin ester, such as is described by Karsten in Lackrohstoff-Tabellen (Paint Raw Material Tables), 7th edition 1981, 23 parts by weight of a colorant/additive mixture, for example according to Example 10 to 31, 21 parts by weight of a mineral oil having a limited aromatic content and narrow boiling point range, for example 210°/230° C. or 230°/260° C., =100 parts by weight.

If Examples 10 to 31 according to the invention are tested using this recipe, excellent printed images and a trouble-free printing process without "build-up" of the inks on the rollers of the printing machine are obtained, for example, in web offset printing or in the heat-set offset printing process.

If, in contrast, the colorants of Preparation Examples 1–9 are tested by the above recipe, i.e. without the additives of the formula (A), although in all cases at first excellent printing results are obtained, a layer consisting of colorant or printing inks builds up on the rollers of the printing machine after a short time of printing (10–100 copies). This "build-up" makes it necessary to interrupt the printing process and requires complete cleaning of the printing rollers. Such a procedure is not practicable in the printing industry.

We claim:

1. Offset printing inks comprising (1) a vehicle, (2) a colorant, and (3) an additive compound, said additive compound being in the offset printing ink in an amount effective to substantially prevent undesirable build-up of the offset printing ink during offset printing, and said additive compound having the formula (A)

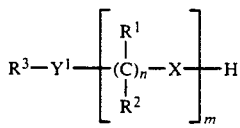 (A)

in which
R¹ and R² independently of one another and independently of each recurring unit, denote H, $C_{1-24}$-alkyl, aryl or $C_{1-24}$-alkaryl,
R³ denotes H, $C_{1-24}$-alkyl, aryl, $C_{1-24}$-alkaryl—where R³ can, if desired carry 1-3 further substituents from the series comprising —O—R¹, —NR¹R² or radicals

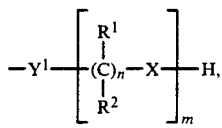

Y¹ denotes O, S, NR¹,
X, independently of each recurring unit, denotes O, S,

where R⁴ is H, $C_{1-24}$-alkyl, aryl, $C_{1-24}$-alkyl-aryl or

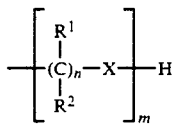

n denotes an integer from 2-4 and
m denotes an integer from 3-450.

2. Offset printing inks according to claim 1 containing compounds of the formula (A) where n is 2, X is O, $R_1$ is H, $CH_3$, $R_2$ is H or $CH_3$, $Y_1$ is O, $R_3$ is the radical of a mono-, di-, tri- or tetrafunctional aliphatic alcohol having 2-8 C atoms.

3. Offset printing inks according to claim 1 containing compounds (A) where R³ is the radical of an aliphatic diol or triol having 2-12 C atoms and m is 10-100.

4. Offset printing inks according to claim 1 containing 0.01-20% by weight of a compound (A).

5. Offset printing inks according to claim 1 containing, as the colorant, at least one dyestuff which was obtained by reacting a dyestuff of the formula $F(Y'H)_n$, in which F is a dyestuff radical,
Y' is —O—, —S—,

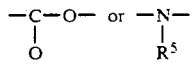

and
R⁵ is H, alkyl, cycloalkyl, n is 1-6, with a compound containing at least one isocyanate group and at least 18 C atoms.

6. Offset printing ink according to claim 1 containing 0.5-20% by weight of a compound (A).

7. In a process for the preparation of a printing ink, wherein the improvement comprises adding to the printing ink an additive compound having the formula (A)

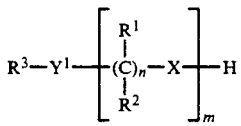 (A)

in which
R¹ and R² independently of one another and independently of each recurring unit, denote H, $C_{1-24}$-alkyl, aryl or $C_{1-24}$-alkaryl,
R³ denotes H, $C_{1-24}$-alkyl, aryl, $C_{1-24}$-alkaryl—where R³ can, if desired carry 1-3 further substituents from the series comprising —O—R¹, —NR¹R² or radicals

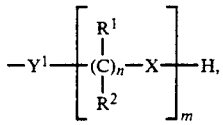

Y¹ denotes O, S, NR¹,
X, independently of each recurring unit, denotes O, S,

where R⁴ is H, $C_{1-24}$-alkyl, aryl, $C_{1-24}$-alkyl-aryl or

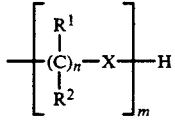

n denotes an integer from 2-4 and
m denotes an integer from 3-450.

* * * * *